United States Patent Office 2,882,267
Patented Apr. 14, 1959

2,882,267

PROCESS FOR THE PRODUCTION OF AZO DYE-STUFFS OF THE PHTHALOCYANINE SERIES

Georg Rösch, Leverkusen, and Karl-Heinz Gehringer, Koln-Deutz, Germany, assignors to Farbenfabriken Bayer Aktiengesellschaft, Leverkusen, Germany, a corporation of Germany No Drawing. Application March 26, 1958
Serial No. 723,952

Claims priority, application Germany March 27, 1957

6 Claims. (Cl. 260—146)

This invention relates to novel dyestuffs and particularly to novel azo dyestuffs of the phthalocyanine series.

It is an object of the present invention to provide novel dyestuffs. Another object is to provide novel dyestuffs which have good fastness properties. A further object is to provide a simple process for the production of said dyestuffs. More objects will appear hereinafter.

These objects are attained in accordance with our present invention by reacting phthalocyanine derivatives substituted by 1–8 acetoacetic acid amide radicals via methylene bridges, with diazo compounds.

The phthalocyanine derivatives used for the process according to the invention may be obtained by reacting metal-containing or metal-free phthalocyanines which are substituted by 1–8 aminomethyl groups, with such quantities of diketene so that all or part of the amino methyl groups are converted into the corresponding acetoacetic acid amide groups.

The aminomethyl phthalocyanines are obtainable, for example, according to the process of German patent specification No. 852,588 by condensing metal-containing or metal-free phthalocyanines which may be substituted, in the presence of condensing agents, with e.g. ω-hydroxy-N-methylphthalimide and saponifying the resultant reaction products. There may also be used the aminomethyl - phthalocyanines containing secondary amino groups which may be obtained e.g. by the process of German patent specification No. 890,108. Of the metal-containing phthalocyanines there are preferably used those of copper, cobalt or nickel, which may be substituted, for example, by phenyl radicals or other substituents.

The reaction of the aminomethyl-phthalocyanines with diketene is preferably carried out in aqueous suspension, if desired in the presence of a water-miscible solvent such as e.g. acetone, methanol or ethanol, or in the presence of a solvent for diketene alone such as acetone. It is advantageous to operate at moderate temperatures. Temperatures within the range of 0–50° C. have generally been found expedient.

Dependent on the quantity of diketene used and on the number of aminomethyl groups contained in the phthalocyanine radical there all or part of the aminomethyl groups react with the diketene to form the corresponding acetoacetic acid amides of the phthalocyanine series. The solubility of the resultant phthalocyanine derivatives in aqueous alkalies is thereby dependent on the number of acetoacetic acid amide radicals contained therein. Compounds containing 1–2 radicals are practically insoluble in aqueous alkalies whereas the compounds containing 4–8 radicals have therein a good to very good solubility.

It is advantageous to use the aminomethyl substituted phthalocyanines in a very fine dispersion which may be obtained by precipitating them with alkalies from the aqueous solutions of their salts.

Diazo components suitable for the new process are both those which contain water-solubilizing groups such as sulfonic acid or carboxylic acid groups, and those which do not contain these groups. The latter components are especially useful. The diazo components may further be substituted by groups generally used in azo chemistry such as, for example, alkyl, alkoxy, nitro, halogen, cyano, sulfonic, sulfonamide, arylazo, amino, acylamino, alkylamino or arylamino groups.

The coupling of the diazonium compounds with the phthalocyanine-acetoacetic acid amides is carried out in conventional manner in aqueous solution or suspension, in substance or on the fibre. If desired, mixtures of diazo compounds may also be used. For the production of dyestuffs by coupling on the fibre, the diazo components may also be used in a stabilized form, for example, as fast-dyeing salts, nitrosamines or diazoamino compounds. For the printing of textiles those diazoamino compounds are especially suitable which are obtained from diazotized amines, which do not contain any sulfonic acid and carboxylic acid groups, and secondary amines (stabilizers) of the aliphatic, aromatic or heterocyclic series. These include, for example, combinations of diazotized amines of the benzene series and 2-alkyl-amino-5-(4)-sulfobenzoic acids or anthranilic acid derivatives which yield on the fibres deep prints with good fastness properties upon printing together with the coupling phthalocyanic compounds and neutral or acid development. The dyestuffs thus obtained yield, dependent on the type of the coupling components used, various shades, especially bluish green or yellowish green shades.

The following examples are given for the purpose of illustrating the invention.

*Example 1*

10.28 parts by weight of the tetraacetoacetic acid amide of tetra-aminomethyl-copper phthalocyanine are stirred with 20 parts by weight of methanol and 16 parts by weight of a 10 percent sodium hydroxide solution and about 60 parts by volume of water are then added. The blue solution thus obtained is stirred into a diazonium solution prepared from 6.7 parts by weight of 1-amino-2-methoxy-4-nitrobenzene, 6 parts by weight of 37 percent hydrochloric acid, 10 parts by volume of water and 13.8 parts by volume of a 20 percent sodium nitrite solution. The mineral acid is then neutralized with sodium acetate and the green dyestuff thus formed is filtered off by suction after brief stirring, washed with water and dried. Yield: 17 parts by weight. The dyestuff is a bright and fast green pigment dyestuff which may be used as a dyestuff for the spinning solution of synthetic fibres, for example based on polyacrylic acid nitrile, or for pigment printing.

The tetraacetoacetic acid amide of the tetra-aminomethyl-copper phthalocyanine may be obtained in the following manner:

83.8 parts by weight of the tetrahydrochloride of tetra-aminomethyl-copper phthalocyanine are dissolved with stirring in 2000 parts by weight of cold water and the free base is precipitated by the introduction of 21.2 parts by weight of sodium carbonate in a fine dispersion, 37 parts by weight of diketene are then added dropwise at room temperature. The reaction mixture is stirred until the reaction is completed and the blue precipitate of the tetraacetoacetic acid amide of the tetra-aminomethyl-copper phthalocyanine is filtered off by suction, washed with water and dried. Yield: 102 parts by weight.

The tetraacetoacetic acid amide dissolves in concentrated sulfuric acid with a green color. It dissolves in aqueous caustic alkalies upon the addition of a little diglycol or dimethyl formamide.

In place of the above dyestuff there may also be used the dyestuffs obtained in the following manner:

(a) 64.2 parts by weight of the monohydrochloride of mono-aminomethyl-copper phthalocyanine are introduced with stirring into 600 parts by weight of cold water and the free base is obtained by the addition of 5.3 parts by weight of sodium carbonate. Subsequently, 10 parts by weight of diketene are added dropwise at room temperature. The reaction mixture is stirred until the reaction is completed and the blue percipitate of the mono-acetoacetic acid amide of the mono-aminomethyl-copper phthalocyanine is filtered off by suction, washed with water and dried. Yield: 68.5 parts by weight.

When instead of 64.2 parts by weight of the mono-aminomethyl-copper phthalocyanine hydrochloride there are used 70.7 parts by weight of di-aminomethyl-copper-phthalocyanine-dihydrochloride, 600 parts by weight of water, 10.6 parts by weight of sodium carbonate and 20 parts by weight of diketene, an excellent yield of the diacetoacetic acid amide of the di-aminomethyl-copper phthalocyanine is obtained in an analogous manner.

(b) 76.8 parts by weight of the trihydrochloride of tri-aminomethyl-cobalt phthalocyanine are dissolved with stirring in 2500 parts by weight of cold water and the free base is precipitated by the introduction of 15.9 parts of sodium carbonate in fine dispersion. Subsequently 27.0 parts by weight of diketene are added dropwise at room temperature. The reaction mixture is stirred until the reaction is completed and the blue precipitate of the triacetoacetic acid amide of tri-aminomethyl-cobalt phthalocyanine is filtered off by suction, washed with water and dried. Yield: 91.5 parts by weight.

The triacetoacetic acid amide dissolves in concentrated sulphuric acid in oliveish green shades and scarcely dissolves in aqueous caustic alkalies. For the dissolution in aqueous caustic alkalies it is necessary to add an organic solvent such as diglycol or dimethyl formamide.

(c) 90.35 parts by weight of the pentahydrochloride of penta-aminomethyl-copper phthalocyanine are dissolved with stirring in 2000 parts by weight of cold water and the free base is precipitated by the introduction of 26.5 parts by weight of finely dispersed sodium carbonate. Subsequently, 46.2 parts by weight of diketene are added dropwise at room temperature. The reaction mixture is stirred until completion of the reaction and the blue precipitate of the pentaacetoacetic acide amide of penta-aminomethyl-copper phthalocyanine filtered off by suction, washed with water and dried. Yield: 114 parts by weight.

The pentaacetoacetic acid amide dissolves in concentrated sulfuric acid with a green color, and in aqueous caustic alkalies with a blue color.

(d) 109.9 parts by weight of the octahydrochloride of octa-aminomethyl-copper phthalocyanine are dissolved with stirring in 1000 parts by weight of cold water and the free base is precipitated by the introduction of 42.4 parts by weight of finely dispersed sodium carbonate. Subsequently, 50.4 parts by weight of diketene are added dropwise at room temperature. The reaction mixture is stirred until the reaction is completed and the blue precipitate of the hexacetoacetic acid amide still containing two aminomethyl groups, is filtered off by suction, washed and dried. Yield: 130 parts by weight.

The reaction product dissolves in concentrated sulfuric acid with a green color.

*Example 2*

A cotton fabric is impregnated at 50° C. on the padding machine with the following solution, then squeezed with suction and dried:

30 parts by weight of octaacetoacetic acid amide of octa-aminomethyl-copper-phthalocyanine
100 parts by volume of alcohol
30 parts by volume of sodium Turkey red oil and
18 parts by volume of sodium hydroxide solution (38° Bé.) are pasted and made up at 50° C. with water to 1000 parts by volume.

Subsequently the fabric, now dyed in a blue shade, is treated with a solution containing 10 parts by weight of the diazonium salt of 1-amino-2-methoxy-4-nitrobenzene and 2 parts by volume of glacial acetic acid in 1000 parts by volume of water at 20° C. for a half hour, then rinsed and dried. The fabric is then dyed in a green shade.

Further valuable dyeings on cotton are obtained by operating in a manner described above, but effecting the treatment with the diazonium salt solutions of the following compounds:

| | Shade |
|---|---|
| Aniline | bluish green; |
| 3-chloraniline | Do. |
| 2-chloraniline | turquoise blue. |
| 1-amino-2-methyl-4-chlorobenzene | bluish green. |
| 1-amino-2-methyl-5-chlorobenzene | Do. |
| 1-amino-2-methoxy-5-sulphonic acid-N,N-diethylamide | Do. |
| 1-amino-2-methyl-5-nitrobenzene | green. |
| 1-amino-4-methyl-2-nitrobenzene | Do. |
| 1-amino-2-nitro-4-chlorobenzene | Do. |
| 3,3'-diamino-4,4'-dimethyl-1,1-azobenzene | moss green. |
| 2-amino-4-chloro-diphenyl ether | bluish green. |
| 2-amino-4,4'-dichlorodiphenyl ether | Do. |
| 1-amino-2,5-dichlorobenzene | Do. |
| 1-amino-2-methyl-4-benzoylamino-5-chlorobenzene | green. |
| 1-amino-2-methyl-5-sulphonic acid-N,N-dimethylamide | bluish green. |
| 2-amino-5-diphenylsulphone | Do. |
| 1-amino-2-chloro-5-tri-fluoromethyl-benzene | Do. |
| 1-amino-2-methoxy-4-benzoylamino-5-methyl-benzene | Do. |
| 1-amino-2-nitro-4-methoxy-benzene | Do. |
| 1-amino-3,6-diethoxy-4-benzoylamino-benzene | Do. |
| 1-amino-2-chloro-4-benzoylamino-5-methoxy-benzene | Do. |
| 3,6-methoxy-4-amino-4'-nitro-1,1-azobenzene | blackish brown. |
| 3,6-methoxy-4-amino-2',6'-dichloro-4-nitro-1,1-azobenzene | Do. |
| 1-amino-2-trifluoromethyl-4-chlorobenzene | bluish green. |
| 1-amino-2-methoxy-5-chlorobenzene | Do. |
| 1-amino-2-methyl-4,5-dichlorobenzene | Do. |
| 1-amino-2,4-dimethyl-5-benzoylamino | Do. |
| 1-amino-2-methyl-5-cyanobenzene | Do. |
| (2-amino-3-methoxy-phenyl)-benzylsulphone | Do. |
| 2-amino-4-trifluoromethyl-diphenylsulphone | green. |

The octaacetoacetic acid amide of octa-amino-methyl copper phthalocyanine can be obtained by the following method:

109.9 parts by weight of the octahydrochloride of octamino-methyl-copper phthalocyanine are dissolved with stirring in 1000 parts by weight of cold water and the free base is precipitated by the introduction of 42.4 parts by weight of finely dispersed sodium carbonate. Subsequently, 74 parts by weight of diketene are added dropwise at room temperature. The reaction mixture is stirred until the reaction is completed and the blue precipitate of the octaacetoacetic acid amide of octa-aminomethyl-copper phthalocyanine is filtered off by suction, washed with water and dried. Yield: 147 parts by weight. In an analogous matter, there may also be used the corresponding nickel or cobalt compound.

The octaacetoacetic acid amide dissolves in concentrated sulfuric acid with a green color, in aqueous caustic alkalies with a blue color.

When instead of the above dyestuff the dyestuffs listed in Example 1 under (c) and (d) are used, the corresponding dyeings are obtained.

*Example 3*

A cotton fabric is printed with a printing paste which is prepared in the following manner:

40 parts by weight of hexaacetoacetic acid amide of hexa-amino-methyl-copper phthalocyanine
100 parts by volume of methylated spirit
40 parts by volume of sodium Turkey red oil and
20 parts by volume of sodium hydroxide solution (38° Bé.) are pasted and dissolved at 50° C. with 200 parts by volume of water. The solution is then made up with water and a wheat starch-tragacanth thickening to 1000 parts by weight of the printing paste.

After printing, the fabric is dried and developed with a solution of the diazonium salt of 1-amino-2-methoxy-4-nitrobenzene. Subsequently the thickening is washed out in conventional manner and the fabric soaped. A bluish green print is obtained.

Printing may also be carried out in such a manner that further coupling components such as, for example, 1-(2′,3′-hydroxynaphthoylamino)-2 - methoxybenzene or 3,3′-dimethyl - 4,4′ - diacetoacetylamino - 1,1′ - diphenyl, are printed on the fabric side by side in conventional manner in the form of alkaline printing pastes so that after the development with the diazonium salt solution and finishing off of the printed fabric there are obtained in addition to green shades other shades, e.g. red and yellow shades.

*Example 4*

15 parts by weight of the octaacetoaacetic acid amide of octa - aminomethyl - copper phthalocyanine are mixed with a quantity equivalent to its coupling value of the diazonium compound from diazotized 1-amino-2-methoxy-4-nitrobenzene and methylaminoacetic acid. 60 parts by weight of this mixture are stirred with 100 parts by weight of a 10 percent sodium hydroxide solution and introduced with stirring into a mixture of 500 parts of tragacanth thickening (65:1000) and 340 parts by volume of water. Cotton is printed with this printing paste. A bright green print is obtained after usual pre-dying and acid steaming. With use of a diazoamino compound from diazotized 1-amino-2-methoxy-5-methylbenzene and 2-isopropyl-amino-5-sulphone-benzoic acid there is obtained a green print according to the process described above which may be developed by neutral or acid treatment.

*Example 5*

16.72 parts by weight of 4-aminobenzene-1-sulphonic acid dihydrate are stirred into 160 parts by volume of water, 24 parts by weight of 37 percent hydrochloric acid and then introduced and 55.4 parts by weight of a 10 percent sodium nitrite solution added dropwise. Into the diazonium solution thus prepared there is introduced dropwise a solution of 15.2 parts by weight of the octa-acetoacetic acid amide of octa - amino - methyl - copper phthalocyanine, 30 parts by volume of methanol and 200 parts by weight of a 5 percent sodium hydroxide solution. Residual mineral acid is neutralized with sodium acetate and the resultant green azo dyestuff completely salted out with common salt, washed with a 10 percent common salt solution and dried. The dyestuff can be used as a pigment dyestuff.

*Example 6*

A cotton fabric is impregnated at 50° C. on the padding machine with a solution obtained by pasting 30 parts by weight of the hexa-acetoacetic acid amide of hexa-aminomethyl-nickel phthalocyanine, with 100 parts by volume of alcohol, 30 parts by volume of sodium Turkey red oil and 18 parts by volume of sodium hydroxide solution (38° Bé.), and making it up with water to 1000 parts by volume at 50° C. then squeezed and dried.

The blue colored fabric is then treated for a half hour with a solution containing 10 parts by weight of the diazonium salt of 1-amino-2-methoxy-4-nitrobenzene and 2 parts by volume of glacial acetic acid in 1000 parts by volume of water at 20° C. then rinsed and soaped. The fabric is thus dyed a green shade.

The hexa-acetoacetic acid amide of hexa-aminomethyl-nickel phthalocyanine can be obtained as follows:

96.4 parts by weight of the hex-chloro-hydrate of the hexa-aminomethyl nickel phthalocyanine are dissolved in 1000 parts of water while stirring. From this solution the free base is precipitated by introducing 30.8 parts by weight of sodium carbonate. Thereafter 55.4 parts by weight of diketene are aded dropwise at room temperature. The reaction mixture is then stirred until the reaction is finished and the blue precipitate of the hexa-acetoacetic acid amide of the hexa-aminomethyl nickel phthalocyanine filtered off, washed with water and dried. Yield: 125 parts by weight.

When instead of 30 parts by weight of the hexa-acetoacetic acid amide of hexaaminomethyl-nickel phthalocyanine there is used the equivalent quantity of the octa-acetoacetic acid amide of octa-aminomethyl-tetraphenyl-copper phthalocyanine a yellowish green dyeing is obtained.

The octa-acetoacetic acid amide of octa-aminomethyl-tetraphenyl-copper phthalocyanine can be obtained as follows:

14 parts by weight of the octa-chloro-hydrate of the green octa-aminomethyl-tetraphenyl-copper phthalocyanine (obtained according to the procedure described in Germany patent specification 852,588, Example 2) are dissolved in 140 parts of cold water while stirring. From this solution the free base is obtained as precipitated by introducing 4.24 parts by weight of sodium carbonate. Thereafter 8.1 parts by weight of diketene are added dropwise at room temperature. The reaction mixture is then stirred at room temperature until the reaction has finished. The octa-acetoacetic acid amide of the octa-aminomethyl - tetraphenyl - copper phthalocyanine, obtained as a green precipitate, is filtered off, washed with water and dried. Yield: 17 parts by weight.

We claim:

1. A dyestuff of the formula

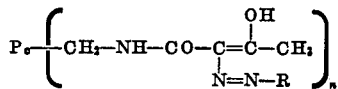

wherein $P_c$ represents a heavy metal containing phthalocyanine radical selected from the group consisting of phenyl-substituted and unsubstituted phthalocyanine radicals said heavy metal being selected from the group consisting of cobalt, copper and nickel, R a radical of a diazo compound selected from the group consisting of benzene, azo benzene, diphenylether and diphenylsulfone series and $n$ a whole number of 1–8.

2. A dyestuff of the formula

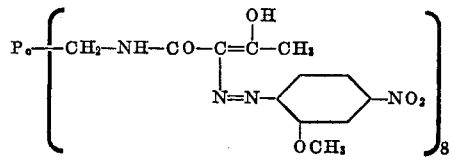

wherein $P_c$ stands for the radical of copper phthalocyanine.

3. A dyestuff of the formula

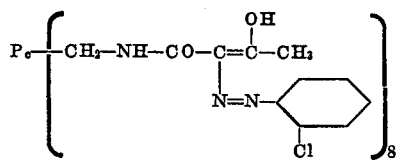

wherein $P_c$ stands for the radical of copper phthalocyanine.

4. A dyestuff of the formula

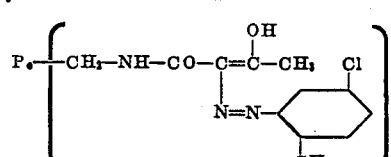

wherein $P_c$ stands for the radical of a copper phthalocyanine.

5. A dyestuff of the formula
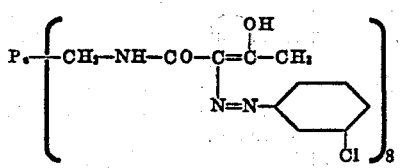
wherein $P_c$ stands for the radical of copper phthalocyanine.
6. A dyestuff of the formula
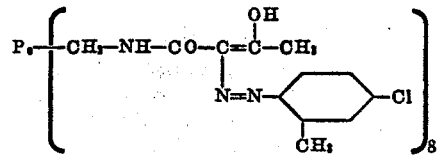
wherein $P_c$ stands for the radical of copper phthalocyanine.
No reference cited.